Dec. 15, 1959   P. M. CHRISTENSEN ET AL   2,916,904
LOCKING MEANS FOR CASING ENCLOSED MECHANISMS
Filed April 10, 1952   3 Sheets-Sheet 1

INVENTORS
PAUL M. CHRISTENSEN,
HARRY COHEN
BY Edwin Linroh &
Harry Cohen
ATTORNEYS Dec. 15, 1959 P. M. CHRISTENSEN ET AL 2,916,904
LOCKING MEANS FOR CASING ENCLOSED MECHANISMS
Filed April 10, 1952 3 Sheets-Sheet 2

INVENTORS
PAUL M. CHRISTENSEN,
HARRY COHEN
BY
ATTORNEYS

Dec. 15, 1959   P. M. CHRISTENSEN ET AL   2,916,904
LOCKING MEANS FOR CASING ENCLOSED MECHANISMS
Filed April 10, 1952                                3 Sheets-Sheet 3

INVENTORS
PAUL M. CHRISTENSEN,
HARRY COHEN
BY
ATTORNEYS

United States Patent Office 2,916,904
Patented Dec. 15, 1959

2,916,904

LOCKING MEANS FOR CASING ENCLOSED MECHANISMS

Paul M. Christensen, West Orange, N.J., and Harry Cohen, New York, N.Y., assignors to Federal Electric Products Company, Newark, N.J., a corporation Application April 10, 1952, Serial No. 281,586

6 Claims. (Cl. 70—150)

This invention relates to improvements in locking means for casing enclosed mechanisms in general and, more particularly, to improvements in locking means for casing enclosed switches or circuit breakers.

One object of the present invention is the provision of generally improved means for locking the casing of a casing enclosed mechanism having an externally mounted operating handle.

Pursuant to the above object of the present invention, there is provided, in a casing having an openable cover with an operating handle mounted thereon, improved means for releasably locking the cover to the casing independent of the operating handle.

Another object of the present invention is the provision of interlock means in a casing enclosed mechanism of the above character which may be readily released by the same one hand that grips the operating handle.

Yet another object of the present invention is the provision of interlock means in a casing enclosed mechanism of the above character which positively prevents the opening of the casing cover when the operating handle is locked in a predetermined position.

The above and other objects, features and advantages of the present invention will be more fully understood from the following description considered in connection with the accompanying illustrative drawings.

Figures 1, 2, 2A, 2B:
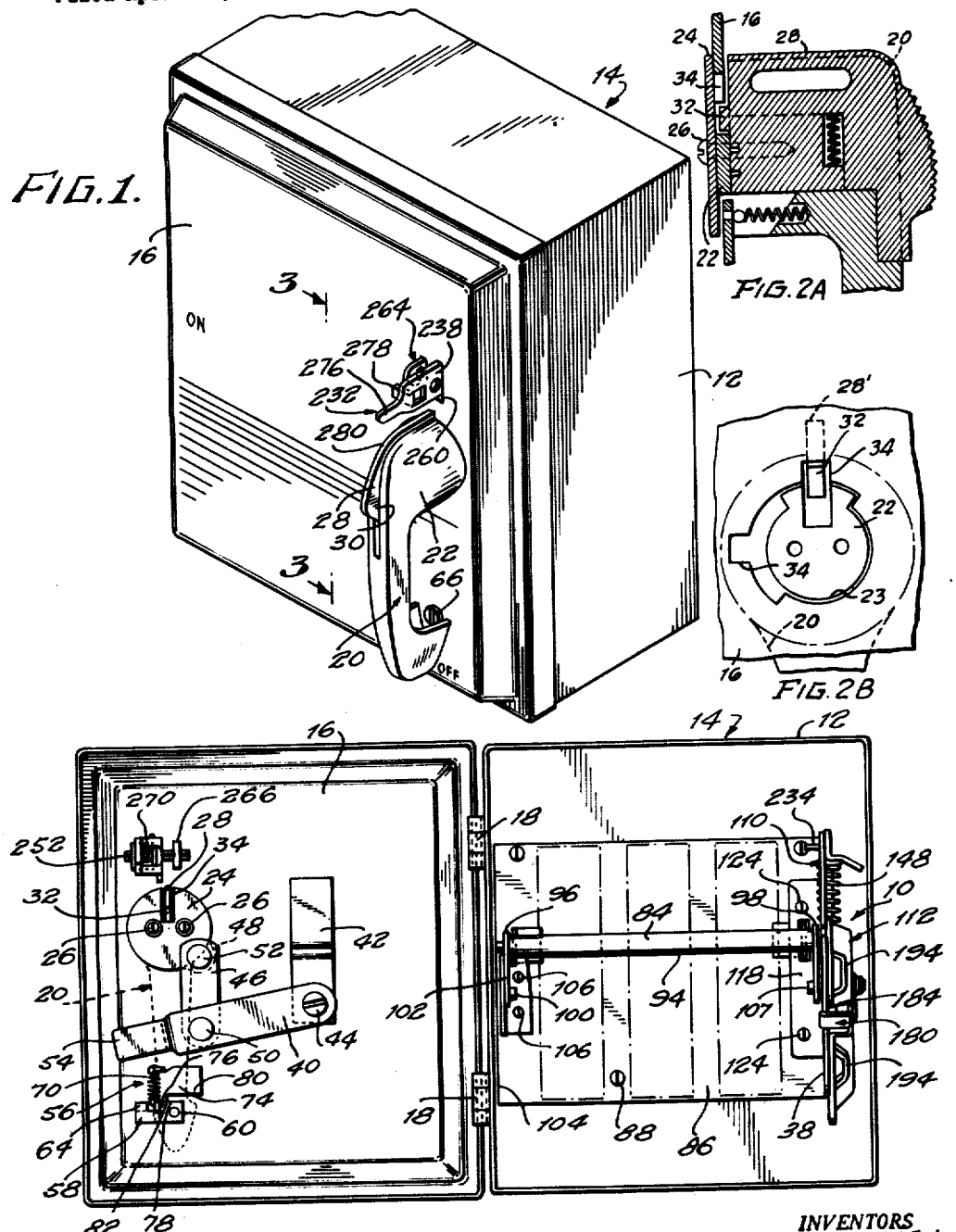
Fig. 1 is a perspective view of a casing and cover according to the present invention, with the cover shown in a closed condition.
Fig. 2 is a front view of the casing and cover of Fig. 1, with the cover shown in an open condition.
Fig. 2A is a fragmentary vertical cross-section through the handle 22 and associated parts in Fig. 1.
Figure 3:
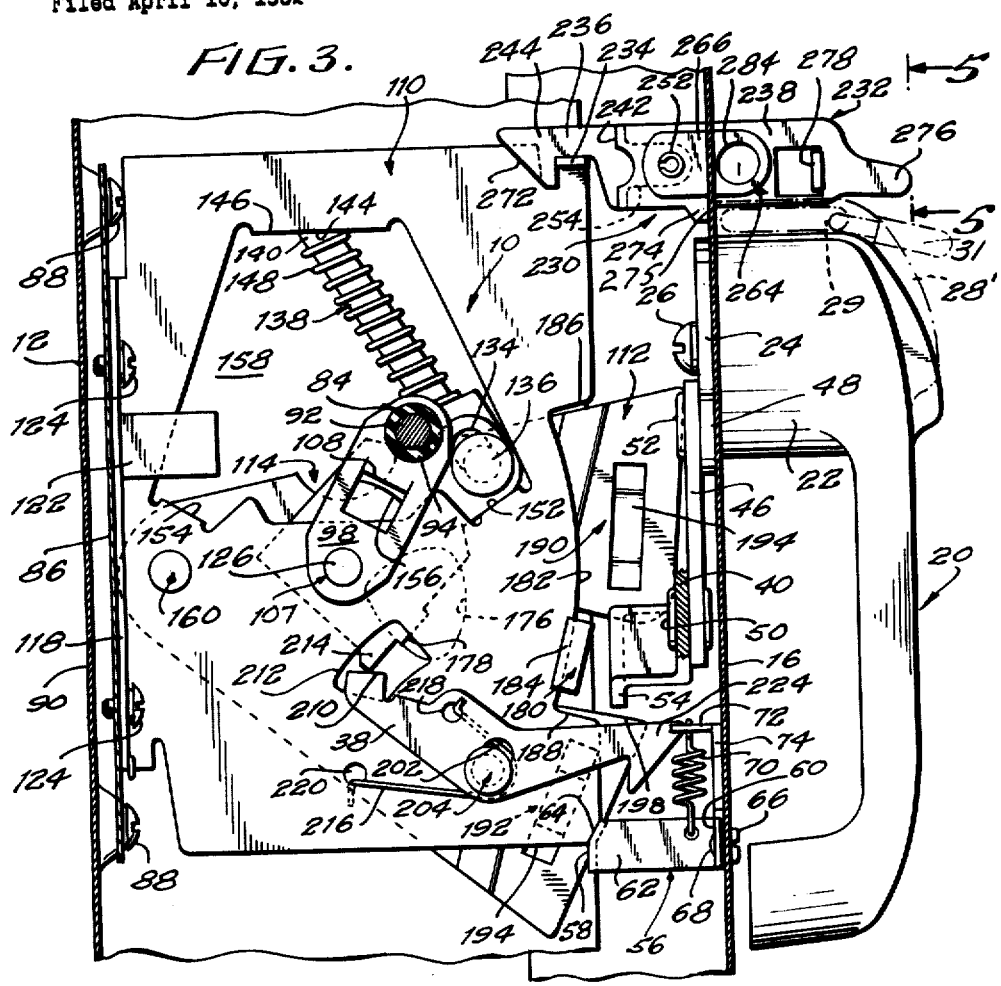
Figures 5, 6:
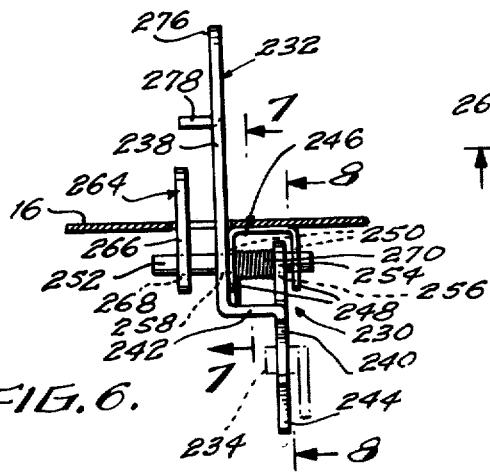
Figure 4:
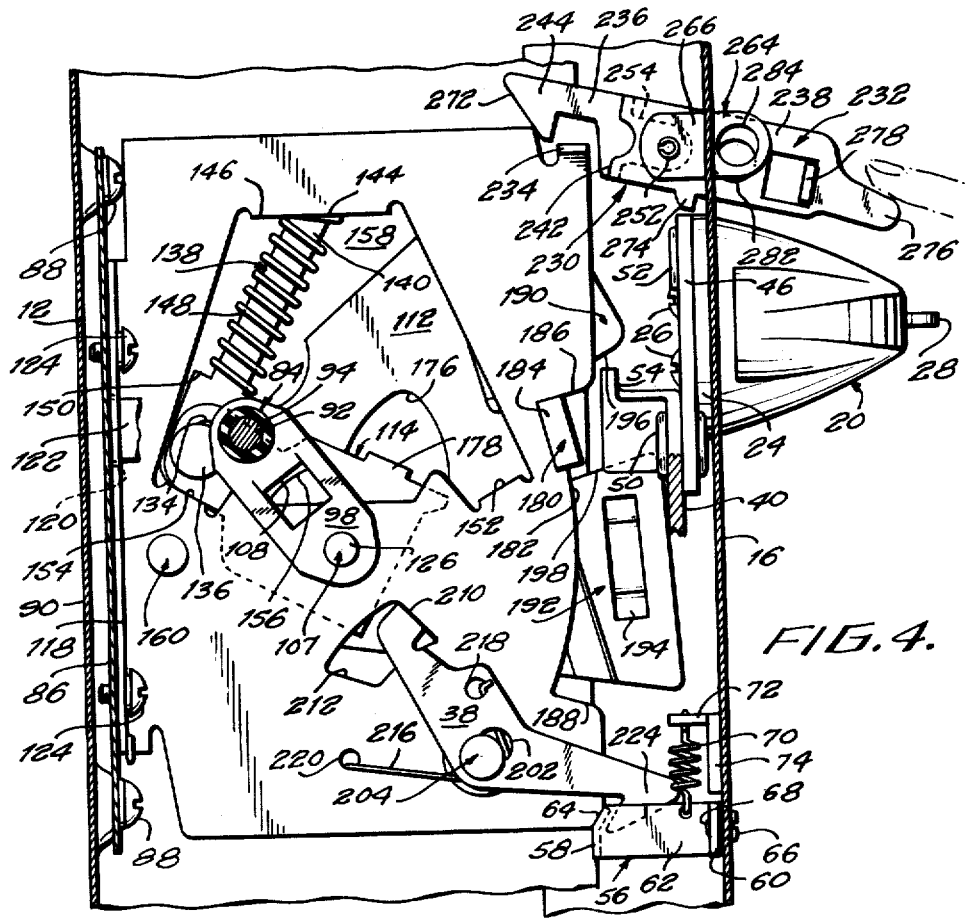
Figures 7, 8:
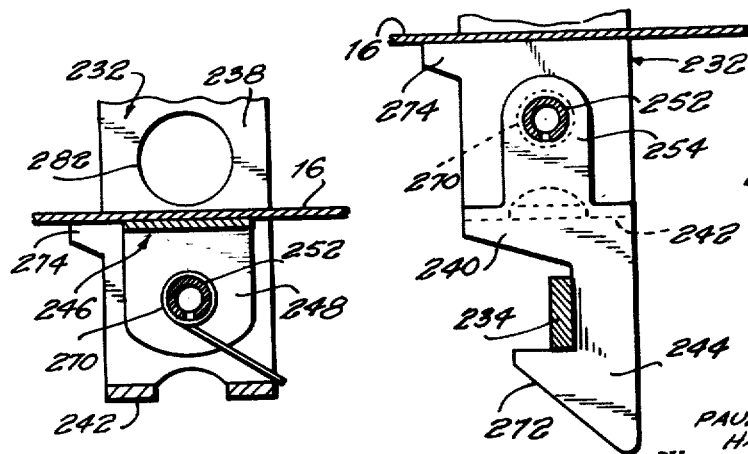

Fig. 2B is a view of the apparatus in Fig. 2A, omitting disc 24 thereof and with part 28 of Fig. 2A shown in a different position designated 28';

Fig. 3 is a sectional view taken on the line 3—3 of Fig. 1;

Fig. 4 is a view similar to Fig. 3, with the operating handle and its associated mechanism shown in another position;

Fig. 5 is a sectional view taken on the line 5—5 of Fig. 3;

Fig. 6 is a sectional view taken on the line 6—6 of Fig. 5;

Fig. 7 is a sectional view, on an enlarged scale, taken on the line 7—7 of Fig. 6; and Fig. 8 is a sectional view, on an enlarged scale, taken on the line 8—8 of Fig. 6.

Referring to the drawings in detail, the switch operating mechanism 10 is preferably of the type disclosed in application Ser. No. 144,636 filed February 17, 1950, now Patent No. 2,760,021, issued August 21, 1956, for Operating Mechanism for Interlock for Enclosed Switch, in the name of Thomas M. Cole and Paul M. Christensen, and assigned to the assignee of the present application, with such changes as will specifically be described below.

The switch operating mechanism 10 is mounted in the box 12 of the casing or enclosure 14 for causing the engagement and disengagement of the separable contacts of a suitable switch or circuit breaker (not shown). The box 12 is provided with a cover 16 which is hinged at one side thereof, as indicated at 18, so that said cover may be swung to closed and open positions, as illustrated in Figs. 1 and 2, respectively.

A switch-operating handle 20 is mounted for turning movement on cover 16, externally of the latter. Said handle is preferably of the type illustrated and described in the copending application of Egmont Arens, Serial No. 75,652, filed February 10, 1949, now Patent No. 2,672,-746, issued March 23, 1954, and assigned to the assignee hereof. As is fully illustrated and described in said application, and as here shown, the hub portion 22 of handle 20 registers with an opening 23 in the cover 16, a disk 24 being disposed at the inner surface of said cover and being connected to said hub by screws 26, said handle being provided with a rectilinearly movable locking member 28 slidably movable in a slot 30 of the handle from a retracted or handle-releasing position, as here shown, to a projected or handle-locking position, as indicated at 28' in Figs. 2B and 3. As further illustrated and described in said application, locking member 28 has an elongated opening 29 which is disposed internally of the handle hub 22 when the locking member is in said retracted position, and which is disposed externally of the handle in said projected handle-locking position, a removable lock 31 disposed in said opening serving to hold said locking member in its handle-locking position. As here shown, the handle is movable through 90° to and from its "on" and "off" positions, illustrated in Figs. 4 and 3, respectively, and can be locked by the locking member 28 in either of said positions.

It will be noted that locking member 28 is provided with a locking element 32 which is adapted to cooperate with the slot 34 for locking handle 20, there being provided two such slots 34 which are displaced 90° for locking handle 20 in either the "on" or the "off" position, as fully disclosed in said copending application of Egmont Arens. An interlock device or latch 38, hereinafter more fully described, is provided on the switch operating mechanism for preventing the opening of the cover in the "on" position of the handle 20.

As illustrated and described in said copending application of Egmont Arens, and as here shown, the switch-operating handle 20 is operatively connected to the lever 40 (Fig. 2). Said lever is pivotally mounted at one end thereof to a bracket 42 in any suitable way, as by a pivot stud or shouldered screw 44, said bracket being welded or otherwise secured to the inner side of the cover. The disk 24 is connected to the lever 40 by a link 46 which is pivotally connected at its opposite ends to said lever, intermediate the opposite ends of the latter, and to a radially projecting lug or ear 48 in disk 24, by means of the pivot studs 50 and 52, respectively. An offset end portion 54 of the handle operated lever 40 releasably engages the switch-operating mechanism 10, as will presently appear, for operating the latter to open and close the switch.

The casing cover 16 is provided with an interlock release element or keeper 56 (Figs. 2, 3 and 4) mounted for turning movement on the inner surface of the cover and which extends inwardly of the casing. More particularly, interlock release 56 is provided with the opposing end portions 58 and 60 which are normal to the central portion 62 and which extend in opposite directions therefrom, as illustrated in Figs. 2, 3 and 4, said portion 58 being provided with an inwardly inclined latch element 64. Interlock release 56 is operated by a screw-headed stud 66 which is mounted for rotation in cover 16 and which is suitably secured to end portion 60 of release 56 as at 68. It will be understood that the rotation of stud 66 on the outer surface of the cover causes interlock release 56 to turn on the inner surface of the cover about the axis of said stud. The interlock release is biased into its normal locking position (Fig. 2) by the tension spring 70, one end of which is secured in portion 62 of the interlock and the other end of which is secured in the extending portion 72 of a stop member 74 secured to the inner surface of the cover. As illustrated in Fig. 2, spring 70 biases the interlock release for rotation in a clockwise direction (viewing the inner surface of the cover), said rotation being limited by the abutment of side edge 76 of the interlock against the stop member 74. Rotation of the interlock release in the opposite or unlocking direction by stud 66, against the bias of spring 70, is limited by the engagement of corner portion 78 of the interlock release against side edge 80 of the stop member.

The switch-operating mechanism 10 is disposed in the box 14 for moving a bail or shaft 84 to open and close the separable contacts of a switch (not shown) which is carried by a mounting plate 86 secured by screws 88 to the inner surface of the back wall or pan 90 of the casing. The switch may be of the construction shown in the application of Paul M. Christensen, Ser. No. 75,637, filed February 10, 1949, now Patent No. 2,689,291 issued September 14, 1954, and assigned to the assignee of our present application. As here shown, the bail or shaft 84 comprises a metallic rod 92 (Fig. 3) having an insulating covering 94 and provided with the spaced arms 96 and 98 at the ends thereof. Arm 96 is mounted for pivotal movement about a pivot stud 100 carried by a pivot plate 102 secured to plate 86, adjacent the side edge 104 thereof, by screws 106 and extends upwardly therefrom. Arm 98 is mounted for pivotal movement about a pivot stud 107 carried by the switch-operating mechanism 10 and is provided with a struck-out portion 108 which is engaged in said mechanism for movement thereby to effect the pivotal movement of the bail about an axis extending between said pivot studs 100 and 107, as will presently appear.

The switch-operating mechanism comprises the mounting plate 110 on which is pivotally mounted a drive lever or actuator 112 and a crank arm 114. Mounting plate 110 is secured to plate 86 adjacent the edge thereof opposite edge 104. Said plate 110 has an inturned portion 118 provided with a rectangular slot 120, a struck-up guide portion 122 of plate 86 extending through said slot, and said inturned portion being secured to plate 86 by screws 124 whereby the plate 110 is mounted in opposition to plate 102.

The crank-arm 114 is mounted for pivotal movement on the stud 107, being disposed adjacent plate 110. Said crank-arm 114 is provided with an elongated aperture 134 through which is disposed a pivot stud 136 on which a toggle arm 138 is mounted for pivotal movement. Said toggle arm 138 is provided with an axially extending portion 140 of reduced width, the free end of which extends through a slot 144 defined in an ear 146 provided on the plate 110, said arm being slidably movable in the slot and said ear extending in a direction outwardly of the casing. A helical compression spring 148 is mounted on said portion 140, one end thereof engaging said ear and the other end engaging the shoulders 150 of said toggle arm 138. It will be understood that crank-arm 114 and said arm 138, provided with spring 148 together comprise a spring toggle mechanism with a snap action in opposite directions. The disposition of said toggle in the "off" position of the switch-operating mechanism is illustrated in Fig. 3, the disposition of the toggle mechanism in the "on" position being illustrated in Fig. 4.

It will be apparent that when the toggle joint formed at pivot stud 136, is carried beyond the toggle centerline extending between pivot stud 107 and slot 144 in ear 146, the action of the spring 148 will snap the toggle mechanism to the position illustrated in Fig. 4. Similarly, when the toggle joint is overcentered from the position shown in Fig. 4, it will be snapped back to the position illustrated in Fig. 3. The outwardly bent portion 152 of plate 110 provides a detent or stop to limit the travel of the toggle mechanism in its "off" position and a similar portion 154 limits the travel of the toggle mechanism in its "on" position.

In order to effect the aforementioned pivotal movement of the bail, the crank arm is provided with an arcuate slotted portion 156 in which the struck-out part 108 of bail arm 98 is engaged, said part extending through the opening 158 in plate 110. It will be apparent that during the movement of the toggle mechanism to and from the "on" and "off" positions thereof, the bail is carried by the crank arm and pivots about the companion pivot studs 100 and 107.

Operative engagement between the handle operated lever 40 and the crank-arm for the operation of the toggle mechanism is effected through the drive lever 112. Said drive lever is mounted for pivotal movement on a pivot stud 160 extending outwardly from plate 110. Said pivot stud is in alignment with the pivot stud 107, being positioned therebelow. The drive lever 112 is spring biased in a counter-clockwise direction viewing Figs. 3 and 4, as disclosed in detail in said copending application, Ser. No. 144,636, and said drive lever is provided with an aperture 176 in which there is engaged the part 178 extending from the crank-arm for the operation of the toggle mechanism upon the movement of the drive lever by the handle-operated lever 40, as will presently appear. The drive lever is retained against outward displacement relative to plate 110 by a struck-out portion 180 thereof which overlies an arcuate peripheral portion 182 of said plate and which is turned down at 184 to prevent said displacement. The shoulders 186 and 188 formed in plate 110 at the ends of said peripheral portion 182, serve as detents or stops for the drive lever, shoulder 186 being engaged by portion 180 when the toggle mechanism moves to the "on" position, and shoulder 188 being engaged by portion 180 when the toggle mechanism moves to the "off" position. The drive lever is also provided with offset portions 190, 192 between which said portion 180 extends. Each of said offset portions is provided with a struck-out portion 194 which is adapted for the insertion of a suitable tool, such as a screw-driver, for manual operation of the drive lever when the cover is open. This is advantageous for checking the operation of the switch-operating mechanism for maintenance and repair purposes. It will be understood that the tension of toggle spring 148 is such that the drive lever cannot normally be operated by hand, with cover 16 open, unless said tool is used.

To effect the pivotal movement of drive lever 112 about pivotal pin 160 for overcentering the toggle mechanism when the cover is closed, the previously mentioned offset portion 54, of handle lever 40, is disposed above the struck-out portion 180 of said drive lever and between the opposing edges 196 and 198 of the offset portions 190 and 192, respectively, of the drive lever. In closing the switch-operating mechanism to "on" position, the handle is turned from the position illustrated in Figs. 1 and 3 to the position illustrated in Fig. 4. During said movement of the offset portion 54 engages edge 196 of offset drive lever part 190 and pivots said drive lever about pivot pin 160 in a counter-clockwise direction, viewing Fig. 3. The crank lever 114, having its part 178 in engagement with the drive lever, is moved thereby in the same direction until the toggle mechanism is overcentered and snaps into the position illustrated in Fig. 4, the handle 20 having been turned substantially 90°. In opening the switch, the handle is turned from its position in Fig. 4 to its position in Fig. 3, and during this movement the offset portion 54 thereof engages edge 198 of part 192 to pivot the drive lever in the opposite direction thereby operating the toggle in the opposite direction to the "off" position. It will be noted that the drive lever and the toggle move in parallel planes. As previously described, the operation of the toggle in each direction effects the pivotal movement of the bail to the "on" and "off" positions of the switch, said movement being transverse said parallel planes. It will be noted that since the bail and the drive lever pivot on different centers, only a small throw, substantially 90 degrees, of the switch handle is required to close and open the switch.

To provide interlocking means for the switch, the aforementioned interlock 38 and release 56 are provided. Member 38 is an elongated element having an elongated slotted portion 202 through which there extends the pivot stud 204 secured in plate 110 and extending inwardly thereof. At one end thereof, the member 38 is provided with an angularly extending portion 210 which extends through an aperture 212 in plate 110. Said portion 210 is engaged by an extending part 214 of the crank-arm 114, a sear spring 216 carried on pivot stud 204 and disposed between member 38 and plate 110, biasing said portion 210 to engage said part 214. One end of the spring is engaged in an aperture 218 in member 38, the other end being engaged in an aperture 220 in plate 110. At its other end, member 38 is provided with a latch portion 224. Fig. 3 illustrates the position of member 38 in the "off" position of the switch, part 214 of the crank-arm serving as a detent to limit the movement of member 38.

In the "on" position illustrated in Fig. 4, it will be noted that member 38 has been pivoted so that the latch portion 224 thereof is interposed between the latch portion 64 of interlock release device 56 and the front cover. Member 38 is biased into said latter position by spring 216, it being noted that this results from the fact that the retaining portion 214 of the crank arm moves to the position illustrated in Fig. 4 in the "on" position to permit member 38 to be pivoted to the position illustrated therein, by said spring. It will be apparent that if the handle is pulled outwardly latch element 64 will be intercepted by latch portion 224 to prevent the opening of the cover in the "on" position. However, if interlock release 56 is rotated by screw 66, latch element 64 will be clear of latch portion 224 and the cover may be opened permitting the inspection of the switch-operating mechanism in its "on" position.

In order to releasably latch and lock the cover 16 to the box 12 there is provided interlocking mechanism 230 independent of the operating handle 20, said interlocking mechanism comprising a locking arm 232 pivotally mounted on the cover 16 and a latch member 234 fixed in the casing or box 12. More particularly, locking arm 232 comprises a lever 236 having laterally offset parts 238 and 240 formed integral with a transverse portion 242, as best shown in Fig. 6. The laterally offset part 238 projects outwardly of cover 16 and the laterally offset part 240 projects inwardly of said cover, the part 240 having a depending latch portion 244, as best shown in Fig. 8, which is adapted to interlock with latch member 234. The latch member 234 is formed as a laterally struck-out portion of the mounting plate 110, although it will be obvious to those skilled in the art that said latch member 234 may be formed in any other conventional manner. Secured to the under side of cover 16, in any suitable manner, as by means of welding, is a U-shaped bracket 246 having a pair of spaced depending legs 248 which are apertured at 250 for the reception of pin member 252. Arm 232 is provided with a depending part 254 which is aligned with part 240, part 254 and laterally offset part 238 being provided with an aligned pair of apertures 256 and 258, respectively, which are adapted for the reception of pin member 252 to thereby provide for the pivotal mounting of the arm 232 on the cover 16. It will be noted that the cover 16 is slotted at 260 for the reception of the locking arm 232 which extends therethrough, and that said cover is provided with an additional slot 262 spaced from slot 260 which is adapted for the reception of part 264 which is fixed to said cover. More particularly, slot 262 is dimensioned complementary to the locking part 264, said locking part having a portion 266 extending inwardly of the cover 16 and being provided with an aperture 268 which is snugly received on pin member 252 whereby said locking part will be fixedly secured relative to said cover. It will be noted that the locking part 264 and arm 232 are laterally spaced from each other and lie in substantially parallel planes. The arm 232 is adapted to pivot between the latched position shown in Fig. 3 and the unlatched position shown in Fig. 4, said arm being spring biased into the latched position by means of spring 270 positioned on pin member 252 between part 254 and part 238 of the arm 232. It will be noted that slot 260 is elongated whereby to provide for the aforedescribed pivotal movement of the arm 232. The latch portion 244 of the arm 232 has an inclined edge 272 to provide for a cam action between the latter and latch member 234 on the closing of cover 16. It will be understood that when the cover 16 is closed, the latch portion 244 of arm 232 will interlock with the latch member 234 as shown in Fig. 3. In order to limit the pivotal movement of arm 232 in a latching direction, said arm is provided with a projecting shoulder 274 which is adapted to engage the portion 275 of cover 16 as shown in Fig. 3. The pivotal movement of arm 232 will be limited in an unlatching direction by the hub 22 of handle 20 when locking member 28 is in the retracted position. The arm 232 is provided with a finger portion 276 at the end of said arm positioned outwardly of cover 16 to facilitate the manual manipulation thereof as indicated in Fig. 4. It will be noted that arm 232 is positioned closely adjacent to the hub 22 of handle 20 whereby said arm may be readily released by the same one hand that grips said operating handle. Thus, the positioning of the handle 20 and arm 232 provides for a one hand operation of said arm and handle.

The laterally offset part 238 of arm 232 is provided with a laterally projecting struck-out portion 278 which is adapted to cooperate with the edge 280 of locking member 28 when the latter is in an extended handle-locking position with the handle being in the "off" position. Thus, with the handle in the "off" position, and with locking member 28 locked by padlock 31 in the position 28' shown in Fig. 3, the struck-out portion 278 will be restrained against pivotal movement by said locking member to thereby prevent the unlatching of arm 232 whereby the cover 16 will be locked to the casing or box 12. With the handle in the "on" position, however, the locking of handle 20 by means of member 28 will have no effect on the arm 232, as said locking member will be pivoted out of the range of the struck-out portion 278 of said arm.

In order to lock the cover 16 to the casing 12 independent of the handle 20, the locking arm 232 and the locking part 264 are apertured at 282 and 284, respectively, for the reception of a suitable lock, preferably of the padlock type. The apertures 282 and 284 are substantially the same size and will be in alignment when arm 232 is in the latched position as shown in Fig. 3. Thus, when cover 16 is latched to the casing 12 by means of the interlocking mechanism 230, the passing of a removable lock through apertures 282 and 284 of arm 232 and locking part 264, respectively, will be effective to lock said arm against pivotal movement whereby said cover will be locked to said casing independent of the operating handle 20. Thus, the interlocking mechanism 230 will be effective to releasably latch and lock cover 16 to the casing 12 independent of the positioning of the operating handle 20. As pointed out above, with the handle 20 in the "off" position, the locking of said handle by locking member 28 will be effective to lock the cover 16 to the casing 12 through the coaction of edge 280 of locking member 28 and the laterally projecting part 278 of arm 232. It will be further noted that the operating handle 20 may be locked in either the "on" or the "off" position by means of locking member 28 and that when said operating handle is in an "on" position, cover 16 may only be opened upon the rotation of stud 66 to release interlock release 56, as aforedescribed in detail, and upon the pivotal movement of arm 232, as illustrated in Fig. 4, to release the interlock mechanism 230.

The switch-operating mechanism 10 of the instant apparatus is identical with the switch-operating mechanism of said copending application, Ser. No. 144,636, except that in the instant application, there is provided a portion 234 struck-out from plate 110, and that a single latch portion 224 is provided on device 38 whereby the latter will coact with interlock release 56 only when the handle 20 is in an "on" position. If desired, however, device 38 may be formed as in said copending application, Ser. No. 144,636, in which case said operating handle 20 will have to be moved to an intermediate "open cover" position, so that portion 54 will clear the device 38 for the opening of said cover, as will be readily understood.

While we have shown and described the preferred embodiments of our invention, it will be understood that various changes may be made in the present invention without departing from the underlying idea or principles of the invention within the scope of the appended claims.

Having thus described our invention, what we claim and desire to secure by Letters Patent is:

1. In a casing provided with an openable cover having an operating handle mounted thereon movable to an "on" and to an "off" position, locking means for locking the handle in either of said positions, said locking means including a locking member movable from a first position in which the handle is released to a second position in which the handle is locked both when said handle is in its "on" position and in its "off" position, said locking member having means for cooperating with a lock when the locking member is in its second position for preventing return of the locking member to handle releasing position, means for releasably latching said cover to said casing, said means comprising an arm projecting externally of the cover and movably mounted to be manually operable in a cover-releasing path from one position in which the cover is latched to another position in which the cover is released, said locking member when in said second position and when the handle is in its "off" position being interposed as an obstruction in said cover-releasing path of said arm, whereby the handle may be locked in its "off" position by a lock and the cover is thereby locked closed.

2. In a casing provided with an openable cover and having an operating handle mounted thereon movable to an "on" position and to an "off" position, locking means for said handle including a locking member carried with said handle to "on" and "off" positions and said locking member being movable from a first position in which the handle is released to a second position in which the handle is locked both when said handle is in its "on" position and in its "off" position, said locking member having means for cooperating with a lock when the locking member is in its second position for preventing return of the locking member to handle-releasing position, means for releasably latching said cover to said casing, said means comprising an arm projecting externally of the cover and being disposed in operative range of the thumb of a person's hand when the other fingers of the hand grip the handle and said arm being movably mounted to be operable in a cover-releasing path from one position in which the cover is latched to another position in which the cover is released, said locking member when in said second position and when the handle is in its "off" position being interposed as an obstruction in said cover-releasing path of said arm whereby the handle may be locked in its "off" position by a lock and the cover is thereby locked closed.

3. In combination a casing provided with an openable cover, switching means within the casing operable for making and breaking a circuit, an operating handle mounted on said cover and movable to an "on" and to an "off" position for operating said switching means, locking means for said handle, including a locking member carried with said handle to "on" and "off" positions and movable relative to the handle between a first position in which the handle is released and a second position in which the handle is locked, said locking member having means for cooperating with a separable, externally applied lock when the locking member is in its second position for preventing return of the locking member to handle-releasing position both when the handle is in its "on" position and when the handle is in its "off" position, means for releasably latching said cover to said casing, said means comprising an arm projecting externally of the cover and movably mounted to be operable in a cover-releasing path from one position in which the cover is latched to another position in which the cover is released, said locking member when in said second position and when the handle is in its "off" position being interposed as an obstruction in said cover-releasing path of said arm, whereby the handle may be locked in its "off" position by an applied lock cooperating with said locking member and the cover is thereby locked closed, said locking member when in handle releasing position being carried out of cooperative relation with said arm when said handle is moved away from said "off" position.

4. In a casing provided with an openable cover, switching means within the casing operable for making and breaking a circuit, an operating handle mounted on said cover and being movable to an "on" position and to an "off" position, locking means for said handle including a locking member carried with said handle to "on" and "off" positions and said locking member being movable, when in either "on" or "off" position, from a first position in which the handle is released to a second position in which the handle is locked, said locking member having means for cooperating with a separate, externally applied lock when the locking member is in its second position for preventing return of the locking member to handle-releasing position, means for releasably latching said cover to said casing, said means comprising an arm projecting externally of the cover and movably mounted to be manually operable in a cover-releasing path from a first position in which the cover is latched to another position in which the cover is released, said locking member having a portion external of said cover that is projected as an obstruction cooperating with an external portion of said arm in the cover-releasing path thereof when said handle and said locking member are in their "off" positions and when said locking member is in its second position, whereby the handle may be locked in its "off" position by a separate, externally applied lock and the cover is thereby locked closed, the external portions of said arm and said locking member being disposed out of cooperating relationship when said handle and said locking member are in their "on" positions.

5. Apparatus in accordance with claim 3, further including an enclosed cover latching mechanism within said casing rendered effective to latch the cover closed when said handle is moved to its "on" position, said cover latching mechanism including inconspicuous externally accessible means for releasing said enclosed cover latching mechanism, whereby when said handle is in its "on" position and said locking member is held in its second position by an applied lock cooperating with said locking member, said handle is locked in its "on" position and the cover is thereby locked closed in a releasable manner.

6. Apparatus in accordance with claim 3, wherein said cover further includes means additional to said locking member and engageable by an applied padlock and arranged to prevent operation of said arm in the cover releasing direction both when said handle is in its "on" position and when said handle is in its "off" position and regardless of the position of said locking member.

References Cited in the file of this patent

UNITED STATES PATENTS

| | | |
|---|---|---|
| 260,693 | Lee | July 4, 1882 |
| 618,091 | Hegel | Jan. 24, 1899 |
| 1,079,351 | Keppel | Nov. 25, 1913 |
| 1,126,700 | Bull | Feb. 2, 1915 |
| 1,131,752 | Voigt | Mar. 16, 1915 |
| 1,293,911 | Plants | Feb. 11, 1919 |
| 1,553,446 | Horton | Sept. 15, 1925 |
| 1,642,612 | Haarberg | Sept. 13, 1927 |
| 1,681,850 | Getchell | Aug. 21, 1928 |
| 1,719,272 | Lee | July 2, 1929 |
| 1,885,713 | Hammerly | Nov. 1, 1932 |
| 2,121,620 | Workman | June 21, 1938 |
| 2,154,236 | Frank et al. | Apr. 11, 1939 |
| 2,272,825 | Anderson | Feb. 10, 1942 |
| 2,542,332 | Holmsten | Feb. 20, 1951 |
| 2,695,934 | Wills | Nov. 30, 1954 |
| 2,698,361 | Mekelburg | Dec. 28, 1954 |
| 2,760,021 | Cole et al. | Aug. 21, 1956 |